United States Patent Office 3,461,156
Patented Aug. 12, 1969

3,461,156
PROCESS OF PREPARATING ESTERS
William L. Fierce, Crystal Lake, Ill., assignor to Union Oil Company, Los Angeles, Calif., a corporation of California
No Drawing. Filed Sept. 24, 1965, Ser. No. 490,111
Int. Cl. C07c 67/00, 69/14
U.S. Cl. 260—491      6 Claims

ABSTRACT OF THE DISCLOSURE

A process for producing carboxylic acid esters comprising reacting the acid with an organic halide in the presence of an alkaili metal hydroxide and in a mutual solvent consisting of dimethylformamide, dimethylsulfoxide or mixtures of the two. The mutual solvent may also comprise about 10 to 25 percent by volume of water. The products find utility as solvents, as monomers for formation of resins, as plasticizers in resin preparation, as vehicles for enamels and paints, etc.

---

This invention relates to a process for producing carboxylic acid esters, and more particularly to a process for producing esters of carboxylic acids by reacting an organic halogen compound with substantially equimolar amounts of free carboxylic acid and dry alkail metal hydroxide in a solution of dimethyl sulfoxide (DMSO) or dimethylformamide (DMF) or mixtures of DMSO and DMF.

It is known in the art that esters of carboxylic acids can be formed in fair yields by the reaction of a carboxylate salt with an organic halide in the presence of certain organic amides as catalysts. In copending application Ser. No. 248,250, filed Dec. 31, 1962, the instant inventor and R. L. Weichman disclose a method of preparing carboxylic acid esters by reacting a metal salt of a fatty acid with a reactive halogen compound in DMF solution. This procedure has the drawback that the fatty acid salts must be prepared in most cases from the free carboxylic acids which are cheaper and more readily available. Also, the salts are sometimes difficult to handle although good yields of the desired products are obtained by the process of said copending application. Furthermore, many prior art processes are necessarily limited to the use of so-called reactive halogen compounds.

In accordance with the present invention these drawbacks are eliminated, the step of forming the salt is also eliminated and esters are prepared in one step from a broad class of halogen compounds. Thus, in accordance with this invention the halogen compound is reacted with approximately equimolar amounts of free carboxylic acid and dry alkail metal hydroxide in DMF solution at a temperature of about 25° C. to 150° C. and preferably at about 100° C. to 140° C. for at least about one hour and preferably about 1 to 2 hours. The ester is produced directly in this one step and is recovered by conventional procedures such as water-washing to remove the solvent, unreacted alkali and the alkail metal halide by-product and distilling to produce the purified ester. Without limiting the invention to any theory of reaction, it is proposed that at least two reaction routes are possible, using sodium hydroxide, acetic acid and benzyl chloride as illustrative reactants:

(1)
NaOH + CH₃COOH ⟶ CH₃COONa + HOH

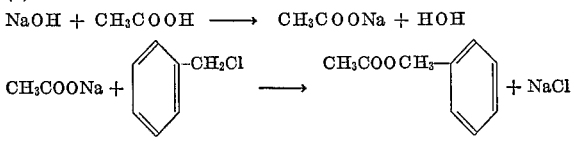

and (2)

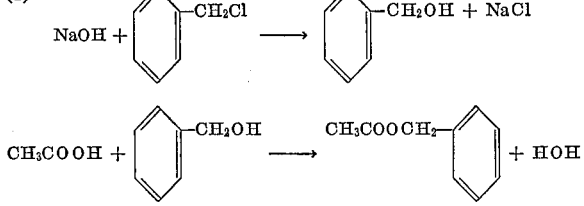

A feature of this invention is the discovery that the esters can be prepared by the direct one-step route and secondly that dimethylsulfoxide gives improved results over dimethyl formamide in the reaction. Another feature of this invention is the discovery that the inclusion of a small amount of water, e.g., about 10 to 25% by volume based on the solvent gives improved yields with either of these solvents and this improvement is even more pronounced when water is used with dimethylformamide.

Accordingly, a primary object of this invention is to provide a method of producing carboxylic acid esters.

Another object of this invention is to provide a simple one-step method of producing carboxylic acid esters by direct reaction of a halogen compound with free carboxylic acid.

An object of this invention is to provide a method of producing esters of carboxylic acids by reacting a halogen compound with substantially equimolar amounts of free carboxylic acid and dry alkail metal hydroxide in a solution of dimethylsulfoxide (DMSO) or dimethylformamide (DMF) or mixtures of said solvents.

Another object of this invention is to provide a method of producing esters by direct reaction of a carboxylic acid and a halogen compound with an alkali metal hydroxide in a solution of DMF or DMSO or their mixtures in the presence of a small amount of water.

Another object of this invention is to provide a method of producing esters by direct reaction of a carboxylic acid and a reactive halogen compound with an alkail metal hydroxide in a solution of DMSO in the presence of about 10 to 25% by volume of water based on the solvent or by using a solvent:H₂O volume ratio of about 10:1 to 4:1.

Still another object of this invention is to provide a method of producing benzyl acetate by the direct reaction of substantially equimolar amounts of glacial acetic acid, benzyl chloride and sodium hydroxide in a solution of DMF or DMSO or mixtures of these solvents at a temperature of about 90° to 150° C.

Another object of this invention is to provide a method of producing benzyl 2-ethylhexanoate by the direct reaction of benzyl chloride and 2-ethylhexanoic acid in DMSO or DMF solution in the presence of solid sodium hydroxide with or without added water.

Another object of this invention is to provide a method of producing aromatic diesters by reaction of reactive di(halomethyl) substituted aromatic compounds with a carboxylic acid in DMSO or DMF solution in the presence of solid sodium hydroxide with or without added water.

Still a further object of this invention is to provide a process of producing p-xylylene di-2-ethylhexanoate. Where higher yields are essential to the economics of a process directed to the preparation of an individual ester the instant invention, as applied to either reactive or relatively inactive halogen compounds, will be applicable and can be used to benefit the process. Preferably, the process of this invention is applied to reactive halogen compounds since the higher yields make the process commercially feasible.

These and other objects of this invention will become apparent or be described as the specification proceeds.

In order to demonstrate this invention the following examples are given.

EXAMPLE I

A flask equipped with a stirrer and condenser was charged with 150 ml. dimethylformamide, 63.3 g. (0.50 mole) benzyl chloride, 33.0 g. (0.55 mole) glacial acetic acid and 22.0 g. (0.55 mole) dry sodium hydroxide. The mixture was stirred at room temperature and 75 ml. additional dimethylformamide was added to make the mixture easier to stir. In about ½ hour the solid material had dissolved and the temperature had reached about 65° C. The solution was then heated with stirring for one hour on a steam bath. When cool the mixture was transferred to a separatory funnel along with 500 ml. water and 200 ml. toluene. After being shaken, the phases were separated. The organic phase was washed three times with 250 ml. portions of water. These washes were added to the original water layer, which was then extracted three times with 75 ml. portions of toluene. These extracts were added to the original organic layer which was dried and distilled. Benzyl acetate was recovered in a yield of 53.8% based on the benzyl chloride charged. The use of a mixture of DMF and DMSO with or without the addition of 10% to 25% by volume of water is also effective.

EXAMPLE II

In this example a series of runs were conducted following the general procedure of Example I to demonstrate the effects of varying the reaction conditions on the reaction of benzyl chloride, acetic acid and sodium hydroxide in the preparation of benzyl acetate. Runs were also conducted to show the preparation of other esters, such as p-xylylene di-2-ethylhexanoate, amyl acetate and decyl acetate. The results of these experiments are reported in Table I, wherein run No. 1 reproduces the results of Example I for comparison.

TABLE I.—ESTER PREPARATION

| Run No. | Reactants | | | Solvent Components (ml.) | | | Vol. percent $H_2O$ | Temp., °C. | Time, hrs. | Ester yield based on halide charged, percent |
|---|---|---|---|---|---|---|---|---|---|---|
| | Halide, mols | Acid, mols | Alkali, mols | DMF | DMSO | $H_2O$ | | | | |
| 1 | Benzyl chloride (0.5) | Acetic (0.55) | NaOH (0.55) | 225 | | | 0 | 97 | 1 | 53.8 |
| 2 | do | do | do | 225 | | | 0 | 97 | 2 | 56.8 |
| 3 | do | do | do | 225 | | | 0 | 135 | 1 | 57.2 |
| 4 | do | do | do | 225 | | 45 | 16.6 | 98 | 1 | 75.4 |
| 5 | do | do | do | 225 | | 90 | 28.5 | 97 | 1 | 49.2 |
| 6 | do | do | do | 250 | | 15 | 5.6 | 97 | 1 | 64.4 |
| 7 | do | do | do | 225 | | 30 | 11.7 | 97 | 1 | 75.2 |
| 8 | do | do | do | 225 | | 60 | 20.8 | 97 | 1 | 75.6 |
| 9 | do | do | do | | 225 | | 0 | 96 | 1 | 70.4 |
| 10 | do | do | do | | 225 | 45 | 16.6 | 98 | 1 | 81.4 |
| 11 | do | 2-ethylhexanoic (0.55) | do | 225 | | | 0 | 97 | 1 | 73.0 |
| 12 | p-Xylylene dichloride (2.0) | 2-ethylhexanoic (4.4) | NaOH (4.4) | 1,500 | | 250 | 14.2 | 98 | 3 | 60.0 |
| 13 | Benzyl chloride (0.5) | Acetic (0.55) | NaOH (0.55) | 270 | | | 0 | 97 | 1 | 61.2 |
| 14 | do | do | NaOH (0.75) | 225 | | 45 | 16.6 | 97 | 1 | 47.6 |
| 15 | do | do | NaOH (0.45) | 225 | | 45 | 16.6 | 97 | 1 | 72.0 |
| 16 | do | do | NaOH (0.55) | 270 | | | 0 | 97 | 1 | 74.4 |
| 17 | do | do | do | 225 | | 30 | 11.7 | 97 | 1 | 76.8 |
| 18 | do | do | do | 225 | | 60 | 20.8 | 97 | 1 | 80.8 |
| 19 | do | do | do | (¹) | | | 0 | 93 | 1 | 13.6 |
| 20 | 1-chloro-pentane (0.50) | do | do | 225 | | 30 | 11.7 | 104 | 1 | 10 |
| 21 | 1-chloro-decane (0.50) | do | do | 225 | | 30 | 11.7 | 119 | 1 | 29.6 |

¹ 225 ml., 1-propanol.

The results (runs 1, 2, 3, 9 and 11) shown in Table I indicate that the use of pure solvents without water allows the production of either aromatic monoesters or aromatic diesters in good yields (53.8 to 70.4% for the monoesters and 60% for the diesters). A comparison of runs 1 and 2 shows that an increase in reaction time at the 100° C. level has only a small influence on the ester yield. Similarly, comparing runs 1 and 3 shows that the temperature at the 1 hour reaction time has some influence on the ester yield. DMSO appears to be somewhat better than DMF as the solvent when used without water (runs 1, 2, 3 and run 9).

Adding water to the reaction mixture (runs 4 to 8, 10 and 11) exhibits a pronounced influence on the ester yield. When the DMF:$H_2O$ volume ratio ranged from about 7.5:1 to 3.75:1 the benzyl acetate yield was near 75% and even higher, according to runs 4, 7, 8 and 10. The presence of water had a less pronounced influence on DMSO than on DMF. The use of greater or smaller amounts of water resulted in reduced yields (runs 5 and 6). With DMSO as the solvent the benzyl acetate yield was 81.4% when the DMSO:$H_2O$ volume ratio was 5:1. In general, DMSO alone constitutes the preferred solvent although the addition of water to DMF gives substantially equivalent results.

The data of Table I also demonstrates that the reaction efficiency is not influenced only by the total volume of solvent with a given weight amount of reactants. Thus when the total amount of solvent is DMF or DMSO, the results are inferior to those obtained with the same amount of solvent present as a mixture with water.

Also, the data show that the process of this invention is applicable to the preparation of aromatic esters or diesters. In run No. 12 it is shown that good yields of aromatic diesters are possible by the instant process without an increase in temperature and by using somewhat extended reaction times. The yield of aromatic diester may be further increased by raising the temperature, recycling unreacted materials and through the use of agitation. It was necessary to use larger quantities of toluene and water to work up the product in run 12.

This latter aspect is demonstrated, in relation to aliphatic esters by a comparison of runs 1, 2, 4–9 with run 3. In the former runs, the 100° C. temperature was maintained by placing the reactant mixture on a steam bath. In run 3 the reactant mixture was heated directly to 135° C. while being agitated. The combination of increased temperature and agitation may be used to further increase the yields of ester produced by the process of this invention, or these expedients may be used independent of the other.

The second series of runs (13-21) was conducted to study the influence of using more solvent, varying the amount of NaOH, different solvent combinations and some less reactive halides (1-chloropentane and 1-chlorodecane).

A comparison of runs 1 and 13 shows that an increase in the amount of DMF increased the yield of ester by 7.4%. Runs 4 and 14 show that the use of more than a mole for mole ratio of NaOH to halide and acid reduced the yield by 27.8%, whereupon in run 15, the use of less than a mole for mole ratio of alkali, with DMF and H₂O, brought the yield up to 72%.

Runs 9 and 16 show that an increase in the amount of DMSO as solvent also leads to increased ester yelds. The results obtained through the use of DMSO with water were again better than DMF with water. Changing to 1-propanol as the solvent greatly reduced the yield (run No. 19). Runs 20 and 21 show that other halides are reactive under the conditions of the reaction.

The starting organic halide to be used in the reaction of this invention may be any halide having the formula (1)  R—(X)ₙ wherein R is an organic radical or substituted organic radical which either does not deactivate the halogen (X) or activates the halogen (X), X being Cl, Br, I or F, and n is an integer of 1 to 10, inclusive, and preferably 1 to 5, same indicating the number of reactable halogen atoms in the organic halide. For purposes of this invention the organic halide must have at least one reactable halogen in the molecule. The presence of other non-reactive halogen atoms and other non-interfering substituent groups, known to the art, are not excluded from the definition of Formula 1 as long as at least one halogen present in the molecule is either reactable or activated. Although a preferred type of starting organic halide will subsequently be defined wherein the halogen X is in activated form, both the compounds defined by Formula 1 and this preferred group can have additional substituents of a non-interfering and even activating nature other than that adjacent the halogen atom. Thus the end product esters, whether monoesters or polyesters, can contain additional substituents such as unreacted halogen and the like.

In Formula 1, R can be any organic radical which does not deactivate the halogen X and may contain 1 to 60 carbon atoms, in straight chain, branched chain, saturated, unsaturated, cyclic, polycyclic, aralkyl or heterocyclic configuration, the latter including radicals having 5 cyclic atoms in the ring, of which one or two atoms are heteroatoms (oxygen, sulfur or nitrogen), to include $C_1$ to $C_{20}$ alkyl, $C_3$ to $C_7$ cycloalkyl, $C_1$ to $C_{20}$ alkyl-substituted $C_3$ to $C_7$ cycloalkyl, $C_3$ to $C_7$ cycloalkyl-substituted $C_1$ to $C_{20}$ alkyl, $C_6$ to $C_{18}$ aryl-substituted $C_1$ to $C_{20}$ alkyl (attached to X through the alkyl) and any heterocyclic group such as 5-membered heterocyclic groups having one or two hetero-atoms (—O—, —S—, —N= or >NH) which do not have a deactivating influence on the halogen.

Fluoro compounds, particularly mono-fluoro compounds, are included within the scope of this invention; however, because of their relative inactivity (especially the completely fluorinated types) and also their expense, best results are obtained with the other halogen compounds.

A preferred group of organic halides are the so-called active halogen compounds from within the group of compounds defined by Formula 1 wherein one or more of the halogen atoms are under the influence of an activating group such as a double or triple bond. In this preferred group of organic halides R (of Formula 1) contains at least 2 carbon atoms and as many as 60 carbon atoms with or without one or two hetero-atoms (—O—, —S—, —N=, or >NH) in the molecule and are distinguished by having a methylene group between the halogen entering into the reaction and the activating double or triple bond, e.g., including, in particular, those organic halides containing the following structures (2)
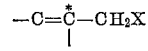

(3)
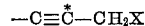

wherein the carbon atoms shown are part of an aliphatic, cycloaliphatic, aryl-substituted alkyl (i.e., benzyl) or heterocyclic radical as heretofore defined for R, or combination aliphatic-heterocyclic, cycloaliphatic-heterocyclic, aromatic-heterocyclic radicals having up to 60 carbon atoms with one or two of the foregoing hetero-atoms or other non-interfering groups known to this art and X is Cl, Br, I or F. The beta carbon atom (*) relative to the halogen X is unsaturated (olefinic or acetylenic) or part of an aromatic ring, cycloolefinic ring, or heterocyclic ring and the gamma carbon atom in Formula 2 can be —N= as part of a heterocyclic ring. Any of the aliphatic, alicylic, aromatic and heterocyclic halides containing these configurations wherein the remaining valences of the carbon atoms are connected to hydrogen or from part of an R group as herein defined can be used in the reaction. Although compounds like vinyl halides, 1-bromo-1-propene and phenyl halides cannot be used, certain compounds like propargyl bromide, iodide and chloride can be used.

The halogen compounds used as reactants in accordance with the broadest aspects of this invention or in accordance with the preferred embodiments can have 1 to 10 reactive halo-groups or more, and preferably 1 to 5 halo groups. In one aspect of this invention R is allylic, or aryl-substituted alkyl in character and contains 3 to 60 carbon atoms depending on its configuration and the number of non-interfering substiutents.

The choice of the organic halide for this reaction is made apparent from the foregoing general discussion, the following specific examples and from the known activities of these compounds as set forth in the text "Organic Synthesis," vol. I, pages 526–533 by V. Migrdichain.

Specific examples of organic halides include the simple aliphatic bromides and iodides such as: methyl bromide; ethyl iodide; 1-bromopropane; 1-bromobutane; 1-iodoheptane; 1-bromooctane; 1-iodononane; 1-bromodecane; 1-bromotridecane; 1 - bromotetradecane; 1 - bromopentadecane; 1-bromohexadecane; and 3-iodoeicosane.

Less reactive aliphatic chlorides and non-terminal substituted aliphatic halides coming within the definition of this invention include: 1-chloropentane; 1-chlorodecane; methyl chloride; 1 - chloropropane; 2 - chloropropane; 2 - chlorobutane; 1,5 - dichloropentane; 1,5 - dichlorohexane; 2-chlorotridecane; 1-chloroeicosane; 1,3-dichloropentadecane; 2,3-dichlorodecane; and 1,2,3-trichlorodecane.

Where R in Formula 1 is an allylic olefinic radical having 3 to 20 carbon atoms, a preferred sub-genus of organic halide starting materials is illustrated by: allyl chloride; allyl bromide; allyl iodide; 2,3-dichloropropene; 3-chloro-1-butene; 3-bromo-1-butene; 1-bromo-2-butene; 3-bromo-1-pentene; 3-bromo-1-hexene; 3-iodo-1-heptene; 3-iodo-1-octene; 3-chloro-1-octadecene; and the like.

Where R is of aromatic character, the organic halide starting materials include those compounds having aromatic radicals of 6, 10, 14, or 18 cyclic carbon atoms connected to the halogen through a methylene group, such as those compounds of the formula (2)  

wherein $R^3$ is $C_6$, $C_{10}$, $C_{14}$ or $C_{18}$ aromatic, i.e., phenyl, naphthyl, anthryl and phenanthryl or the corresponding substituted aromatic radicals having $C_1$ to $C_{20}$ alkyl radicals, or having $C_3$ to $C_7$ cycloalkyl radicals attached to the ring carbon atoms, X is halogen and m is 1 to 10 depending on the aromatic nucleus.

Examples of starting materials of this nature are
benzyl chloride,
benzyl iodide,
benzyl bromide,
α-(chloromethyl)naphthalene,
β-(chloromethyl)naphthalene,
α-(iodomethyl)naphthalene,
β-(iodomethyl)naphthalene,
α-(bromomethyl)naphthalene,
β-(bromomethyl)naphthalene,
α-(chloromethyl)anthracene,
β-(chloromethyl)anthracene,
α-(iodomethyl)anthracene,
β-(iodomethyl)anthracene,
α-(bromomethyl)anthracene,
β-(bromomethyl)anthracene.

Other examples of aromatic starting materials include:

α-chloro-o-xylene,
α-iodo-o-xylene,
α-bromo-o-xylene,
α-chloro-p-xylene,
α-bromo-p-xylene,
α-iodo-p-xylene,
α-chloro-m-xylene,
α-iodo-m-xylene,
α-bromo-p-xylene,
α,α-dichloro-m-xylene,
α,α-dibromo-m-xylene,
α,α-diiodo-m-xylene,
α-α-dichloro-o-xylene,
α,α-dibromo-o-xylene,
α,α-dichloro-p-xylene,
α,β-dichloromethyl-naphthalene,
α,β-dibromomethyl-naphthalene,
1,3-dichloromethyl-naphthalene,
1,6-dichloromethyl-naphthalene,
1,3-dichloromethyl-anthracene,
1,2-dichloromethyl-phenanthrene,
1,6-dibromomethyl-phenanthrene.

Where R is of heterocyclic character the organic halide starting materials include those compounds of the formula (3)     $R^4$—$(CH_2$—$X)_y$ wherein $R^4$ is furyl, thiophenyl, pyrryl, isopyrryl, thiazolyl, isothiazolyl, benzofuryl, isobenzofuryl, thionaphthyl, isothionaphthyl, isoquinoline and the like and $y$ is 1 to 4.

Examples of starting materials under Formula 3 are:

2-chloromethylfuran,
2-bromomethylfuran,
2-iodomethylfuran
3-chloromethylfuran,
3-bromomethylfuran,
2,3-dichloromethylfuran,
2,3-dibromomethylfuran,
2-chloromethylthiophene,
3-bromomethylthiophene,
2,3-diiodomethylthiophene,
2,3,4-trichloromethylthiophene,
3-chloromethylpyrrole,
4-chloromethylisopyrrole,
2-chloromethylthiazole,
4,5-dichloromethylisothiazole,
2,3-dibromomethylbenzofuran,
6,7-dichloromethylisobenzofuran,
3,4-dibromomethylthionaphthene,
4,5,6-trichloromethylisothionaphthene, and the like.

The alicyclic olefinic compounds used as starting materials may have the formulae:

(4)     $R^5$—$(CH_2X)_z$
or
(5)     $R^5$—$(X)_p$ wherein, in the Formula 4, $R^5$ is a $C_3$ to $C_7$ cycloolefinic group which the —$CH_2X$ group is attached to an unsaturated carbon atom or wherein, in Formula 5, X is attached to a methylene carbon atom adjacent an unsaturated carbon atom; X being a halogen and $z$ and $p$ being integers of 1 to 2 for the monoolefinic series and 1 to 4 for the diolefinic series, e.g.:

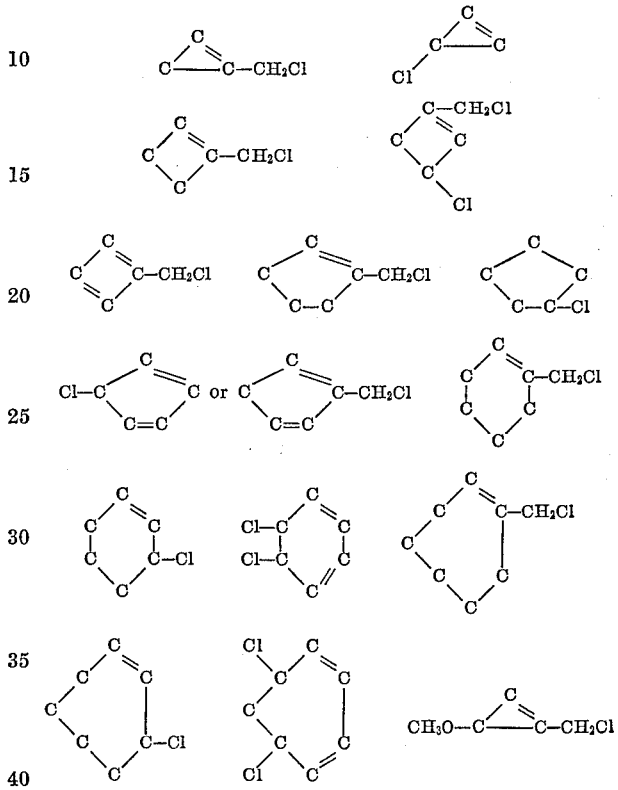

3 - methoxy - 1 - chloromethylcyclopropene, 3 - chlorocyclopropene, are defined. The foregoing formulae are skeletal and the remaining valences of the ring carbon atoms can be satisfied by hydrogen or any non-interfering group, examples of which have already been disclosed.

Examples of alicyclic olefinic compounds are: 3-cyclopentenyl chloride, 3-cyclopentenyl bromide, 3-cyclopentenyl iodide, 3-bromocyclohexene, 3-iodocyclohexene, 3-chlorocyclohexene, 1-cyclopentenyl-methyl bromide, 1-cyclohexenyl-methyl bromide, 1-cycloheptenyl-methyl bromide, 1-cyclopentenyl-methyl iodide, 1-cyclopentenyl-ethyl bromide, 1-cyclohexenyl ethyl bromide, 3-cyclopentyl-3-bromopropene, 1-cyclopentenylbutyl bromide, and 3-cyclohexyl-3-bromopropene.

The allylic olefinic halides, aryl-substituted alkyl halides and heterocyclic halides may all have various substituent groups attached to the principal R, $R^3$, $R^4$, $R^5$ or $R^6$ nucleus, which do not interfere with the reaction. Included in such substituents are hydrocarbon radicals having 1-20 carbon atoms of straight, branched or cyclic configuration, the corresponding alkoxy groups, keto, nitro, and similar groups.

Additional examples of halogen compounds useful as starting materials are bromoacetone, iodoacetone, chloracetone, α-(bromoethyl) benzene, m-bromobenzyl chloride, furfuryl iodide, bromomethyl ether, bromoethyl ether, iodomethyl ether, o-bromobenzyl chloride, p-chlorobenzyl chloride, furfuryl bromide and the like.

Any carboxylic acid containing up to 60 carbon atoms per molecule can be used in the reaction of this invention. Some solid and a few of the liquid carboxylic acids may be insoluble in the mutual solvents or mixtures disclosed herein, but the application of higher temperatures and agitation offsets this difficulty and most of the acids are soluble in solvents DMF and DMSO or their mixtures. As a matter of practicality and economy, any carboxylic acid which does not contain an interfering group such as a sulfonate group can be used and particularly the acids of the aromatic and aliphatic series form a preferred group of acids. Thus saturated aliphatic acids, unsaturated aliphatic acids, aromatic acids, naphthenic acids, cycloaliphatic acids and the like are intended in accordance with this invention and the acid can contain 2 to 6 carboxyl groups.

Accordingly, this invention is directed in one aspect thereof, to the use of carboxylic acids of the formula (6)   $R^1(COOH)_p$ wherein $R^1$ is a $C_1$ to $C_{20}$ aliphatic radical, a $C_6$ to $C_{18}$ aromatic radical, a $C_3$ to $C_7$ cycloaliphatic radical, a $C_1$ to $C_{20}$ alkyl-substituted $C_6$ to $C_{18}$ aromatic radical, a $C_1$ to $C_{20}$ alkyl-substituted $C_3$ to $C_7$ cycloaliphatic radical, a $C_6$–$C_{18}$ aryl-substituted $C_1$ to $C_{20}$ aliphatic radical, and a simple heterocyclic radical containing one or two hetero-oxygen, -sulfur or -nitrogen atoms, and $p$ is an integer of 1 to 6.

Examples of organic acids include but are not limited to formic, acetic, propionic, butyric, valeric, caproic, caprylic, capric, lauric, myristic, palmitic, stearic, arachidic, behenic, lignoceric and the like in the saturated aliphatic monocarboxylic acid series; oxalic, malonic, succinic, glutaric, methyl succinic, adipic, pimelic, suberic, azelaic and 1,14-tetradecanedicarboxylic acid and the like in the saturated dicarboxylic acid series, palmitoleic, oleic, linoleic, linolenic, elaeostearic, ricinoleic, erucic, acrylic, crotonic, vinyl acetic, fumaric, citraconic, 4-heptenoic, 2-octenoic, and ω-undecylenic in the unsaturated $C_1$ to $C_{11}$ monocarboxylic acid series; and benzoic, phenylacetic, o-toluic, m-toluic, p-toluic, β-phenylpropionic, o-tolylacetic, p-tolylacetic, 3,4-dimethylbenzoic, α-phenyl butyric, 2,4,6-trimethylbenzoic, 2-phenylpentanoic, mesitylacetic, α-naphthoic, β-naphthoic, 1,2,3,4-tetrahydro-2-naphthoic, α-naphthylacetic, β-naphthylacetic, pentamethylbenzoic, 2-phenyl-cyclohexancarboxylic, 1-acenaphthoic, diphenylacetic, methyldiphenylacetic, α,α-diphenyl butyric and β,β,β-triphenyl propionic in the aromatic series, having up to 21 carbon atoms per molecule and such heterocyclic monocarboxylic acids as 2-furancarboxylic (2-furoic) acid, 3-furoic acid, tetrahydro-furoic acid, 2-thiophenecarboxylic (2-thenoic) acid, α-furylacetic, 2-tetrahydrofurylacetic acid, 2-pyridinecarboxylic (picolinic) acid, 2-thenylacetic, 3-pyridinicarboxylic (nicotinic) acid, 3-α-furyl-propionic acid, 2,5-dimethyl-3-furoic acid, 3-pyridylacetic acid, 2-thenylmalonic acid, 5-α-furylvaleric acid, indole-2-carboxylic acid, 2-benzofurylacetic acid, 3-quinolinecarboxylic acid, 4-dibenzofurancarboxylic acid, 2-dibenzofurylacetic acid and β-dibenzofuran-3-acrylic acid in the $C_5$ to $C_{15}$ heterocyclic monocarboxylic acid series.

Alicyclic monocarboxylic acids within the foregoing definition are illustrated by those having a total of 4 to 11 carbon atoms such as cyclopropanecarboxylic acid, cyclobutanecarboxylic acid, cyclopentylacetic acid, cis-4-methylcyclohexanecarboxylic acid, cyclohexylacetic acid, β-cyclopentylpropionic acid, and decalin-2-carboxylic acid.

The $C_5$ to $C_{13}$ alicyclic dicarboxylic acids such as 1,1-cyclopropanedicarboxylic acid, 1,1-cyclobutanedicarboxylic acid, cyclohexylmalonic acid, cyclohexane-1,1-diacetic acid and trans-decahydronaphthylmalonic acid are included along with the $C_8$ to $C_{16}$ aromatic dicarboxylic acids such as phthalic acid, terephthalic acid, phenylmalonic acid, phenylsuccinic acid, α-phenyladipic acid and α,β-diphenylsuccinic acid. Alicyclic olefinic acids such as 1-cyclopentenyl carboxylic acid and γ-cyclohexyl-crotonic acid, aromatic olefinic acids such as cinnamic acid, p-vinylbenzoic acid, and β-(1-phenanthryl)-acrylic acid, and heterocyclic olefinic acids such as 2-furylacrylic acid, 2-thienylacrylic acid, propiolic acid and stearolic acid are included. The acids used for the reaction may contain such other non-interfering groups as alkoxy, aryloxy, aldo, keto and the like.

Any tricarboxylic acid or tetracarboxylic acid having an $R^1$ group within the foregoing definition can be used in the reaction of this invention. Non-limiting examples of such polybasic aliphatic acids are tricarballylic acid, aconitic, citric acid, agaracinic acid, and the like; the benzene tricarboxylic acids such as hemimellitic acid (the 1,2,3-acid), trimellitic acid (the 1,2,4-acid), trimesic acid (the 1,3,5-acid); and the benzene tetracarboxylic acids to include prehnitic acid, mellophanic acid and pyromellitic acid.

The process of this invention is carried out by bringing together the desired carboxylic acid and reactive halogen compound with any alkali metal hydroxide, that is, sodium, potassium, lithium, cesium or rubidium hydroxide. For economical reasons sodium and potassium hydroxide are preferred for the reaction. Mixtures of these hydroxides may be used. The reaction is conducted at any temperature which does not cause degradation of reactants or products, i.e., temperatures of about 20° C. to 150° C. and preferably at a temperature of about 100° C. (the temperature of a steam bath). The time involved in the reaction is related to the temperature and the use of higher reaction temperatures generally reduces the time of the reaction. In some instances, higher temperatures than those disclosed herein may be applied depending on the stability of the reactants and products. Experiments have indicated that drastic temperatures or extended periods of contact are neither necessary or feasible, since with even the less reactive halides good yields are obtained using temperatures of about 100° C. to about 140° C. for about one hour.

In general, unless partial esters are to be produced, the reactants are brought together in at least stoichiometric proportions, i.e., the molar ratio of the organic acid to the halogen compound is at least 1:1 although for some reactions it may be desirable to use lesser amounts of the acid, e.g., about 0.5 to 0.9 mol of acid per mole of halogen compound. The use of about 10% to 25% by volume of water, particularly where DMF is the mutual solvent, greatly facilitates the reaction and enhances the yield of ester product.

The ordinary procedures for carrying out the reaction are applicable and after the reaction is completed, the mutual solvent may be removed from the ester by distillation or by washing with water. Distillation under reduced pressure produces a filterable or washable product. The reaction product can be washed with water instead of applying distillation and any unreacted materials separated as the organic layer. In most instances the aqueous layer will contain the formed inorganic salt, the unreacted acid salt and the major portion of the solvent. After the removal of most of the solvent from the ester product, the ester product can be filtered or washed for additional purification. Other known methods of product separation and purification may be applied.

Since the halogen compound and the organic acid used as reactants in the process of this invention can be mono-functional or polyfunctional (having 2 or more replaceable halogens or reactable carboxyl groups) and mixtures of either reactant can be used, this invention relates to the preparation of mixed esters, partial esters and polyesters. By using an unsaturated halogen compound or carboxylic acid or both, the process can be used to prepare unsaturated esters which can be polymerized to form polyester resins as is known in the art.

Accordingly, the beneficial results of this invention are attained by reacting an organic halogen compound as herein defined with an organic carboxylic acid in the presence of an alkali metal hydroxide in a mutual solvent comprising DMF or DMSO or mixtures thereof. The process is applicable with any organic halogen compound having a halogen which is not deactivated and to any organic acid having at least one carboxyl group. Because many of the halogen compounds and carboxylic acids coming within the disclosure of this invention are solids, the advantages of this invention are attained through the use of the mutual solvent. For practical purposes the upper limit of the number of carbon atoms in each reactant is established to be 60 carbon atoms. The process is not hindered by the degree of solubility of the reactants in the solvent because as has been demonstrated the use of agitation and increased temperatures overcomes this difficulty. Also the total amount of solvent used in relation to the total amount of reactants is not critical. In general sufficient solvent is used to attain a homogeneous liquid phase, although the reaction can be conducted using slurry techniques or dilute solutions. The amount of solvent best suited for particular reactants is subject to variation and can be adjusted or established through trial or simple experimentation as is known in the art.

A preferred embodiment of this invention comprises reacting organic halogen compounds of the formula $R^2CH_2X$, wherein $R^2$ is hydrogen, $C_1$ to $C_{19}$ alkyl, $C_3$ to $C_7$ cycloalkyl, and the corresponding alkyl-substituted cycloalkyl, when X is bromine or iodine, and $R_2$ is $C_6$ to $C_{18}$ aryl (meaning 6 to 18 cyclic carbon atoms), $C_1$ to $C_{20}$ alkyl-substituted $C_6$ to $C_{18}$ aryl, the five-membered heterocyclic groups disclosed herein, or one of the activating groups such as $R^2$—CH=CH—, $R^2C\equiv C$—, and $R^2$—O—, wherein $R^2$ is as just defined, when X is Cl, Br or I, with a carboxylic acid having up to 60 carbon atoms, or more specifically acids of the formula $R^1(COOH)_p$, where $R^1$ is as previously defined, p is 1 to 16 and preferably 1 to 4 and an alkali metal hydroxide in a mutual solvent consisting of DMF or DMSO or mixtures thereof with or without 10% to 25% by volume of water at a temperature of about 25° C. to 150° C. for at least 1 hour.

The various ester and polyester products of this invention have known and inherent utilities and can be used as solvents in chemical processes and in forming compositions of matter, as monomers for the formation of polyester resins, as plasticizers in resin preparation, as vehicles for enamels and paints and as intermediates for the synthesis of derivatives and other organic compounds therefrom. Benzyl acetate is used extensively in perfumery, and as a solvent for cellulose acetate and cellulose nitrate.

The embodiments of the invention in which an exclusive property or privilege are claimed are defined as follows:

1. In the process of forming an ester from an organic halide selected from the group consisting of aliphatic halides and aralkyl halides having about 1 to 20 carbon atoms per molecule, an aliphatic carboxylic acid having about 1 to 20 carbon atoms per molecule and an alkali metal hydroxide, the improvement comprising employing substantially anhydrous dimethylsulfoxide as a mutual solvent and adding the organic halide, the carboxylic acid and the alkali metal hydroxide, in substantially anhydrous form, to said mutual solvent, with mixing and at a temperature of about 20 to 150° C.

2. The process of claim 1 in which the organic halide and the carboxylic acid each have about 1 to 10 carbon atoms.

3. The process of claim 1 in which the mutual solvent additionally comprises about 10 to about 25 percent by volume of water.

4. The process of claim 1 in which the alkali metal hydroxide is sodium hydroxide and the organic halide is an aralkyl halide.

5. The process of producing benzyl acetate which comprises reacting at about 20 to 150° C. substantially equimolar proportions of benzyl chloride, acetic acid and an alkali metal hydroxide in a mutual solvent of the group consisting of dimethylsulfoxide and a mixture of dimethylsulfoxide with about 10% to about 25% by volume of water.

6. The process of producing p-xylylene di-2-ethyl hexanoate which comprises reacting at about 20 to 150° C. substantially equimolar portions of p-xylylene dichloride, 2-ethylhexanoic acid and an alkali metal hydroxide in a mutual solvent consisting of a mixture of dimethylsulfoxide and about 10% to about 25% by volume of water based on the total solvent volume.

References Cited

UNITED STATES PATENTS

| | | | |
|---|---|---|---|
| 1,459,971 | 6/1923 | Carter et al. | 260—493 |
| 3,069,459 | 12/1962 | Tsou et al. | 260—475 |
| 3,213,155 | 10/1965 | Schriesheim et al. | 260—533 |
| 3,280,177 | 10/1966 | Webb | 260—489 |
| 3,341,575 | 9/1967 | Fierce et al. | 260—493 |

LORRAINE A. WEINBERGER, Primary Examiner

V. GARNER, Assistant Examiner

U.S. Cl. X.R.

260—287, 295, 326, 332, 347, 410, 468, 469, 475, 476, 484, 485, 486, 493